United States Patent [19]

Walker et al.

[11] Patent Number: 5,192,929

[45] Date of Patent: Mar. 9, 1993

[54] METHOD OF DETECTING A DEFLATED TIRE ON A VEHICLE

[75] Inventors: John C. Walker, Coldfield; Lavinder S. Rehal, Walsgrave-on-Sowe, both of Great Britain

[73] Assignee: Sumitomo Rubber Industries Limited, Japan

[21] Appl. No.: 646,678

[22] Filed: Jan. 28, 1991

[30] Foreign Application Priority Data

Feb. 9, 1990 [GB] United Kingdom ................ 9002925

[51] Int. Cl.⁵ .......................................... B60C 23/00
[52] U.S. Cl. ................................... 340/444; 340/442; 340/671; 73/146.5
[58] Field of Search ............... 340/442, 444, 669, 670, 340/671; 73/146.2, 146, 146.5

[56] References Cited

U.S. PATENT DOCUMENTS 4,876,528 10/1989 Walker et al. ...................... 73/146.5

FOREIGN PATENT DOCUMENTS 0291217 11/1938 European Pat. Off. .

Primary Examiner—Jin F. Ng
Assistant Examiner—Dov Popovici

[57] ABSTRACT

A method of detecting a partially deflated pneumatic tire on a vehicle having four tires each mounted on a wheel comprising sensing the angular velocity of each wheel by providing for each wheel, a signal generator to provide a single signal or pulse for each turn of the wheel, characterized by selecting a first wheel and measuring the time for one rotation of that first wheel, after beginning the first measurement similarly measuring the times of rotation for each other wheel, storing the times for each of the wheels for at least three rotations of each wheel and averaging the times to produce an average angular velocity value for each wheel, processing the four signals in a processor unit which subtracts the sum of the signals from one pair of diagonally opposite wheels from the sum of the signals from the other pair of diagonally opposite wheels, sensing when the magnitude of the result is between 0.05% and 0.60% of the mean of the two sums and when it is operating a warning device to indicate a tire is partially or completely deflated.

19 Claims, 2 Drawing Sheets

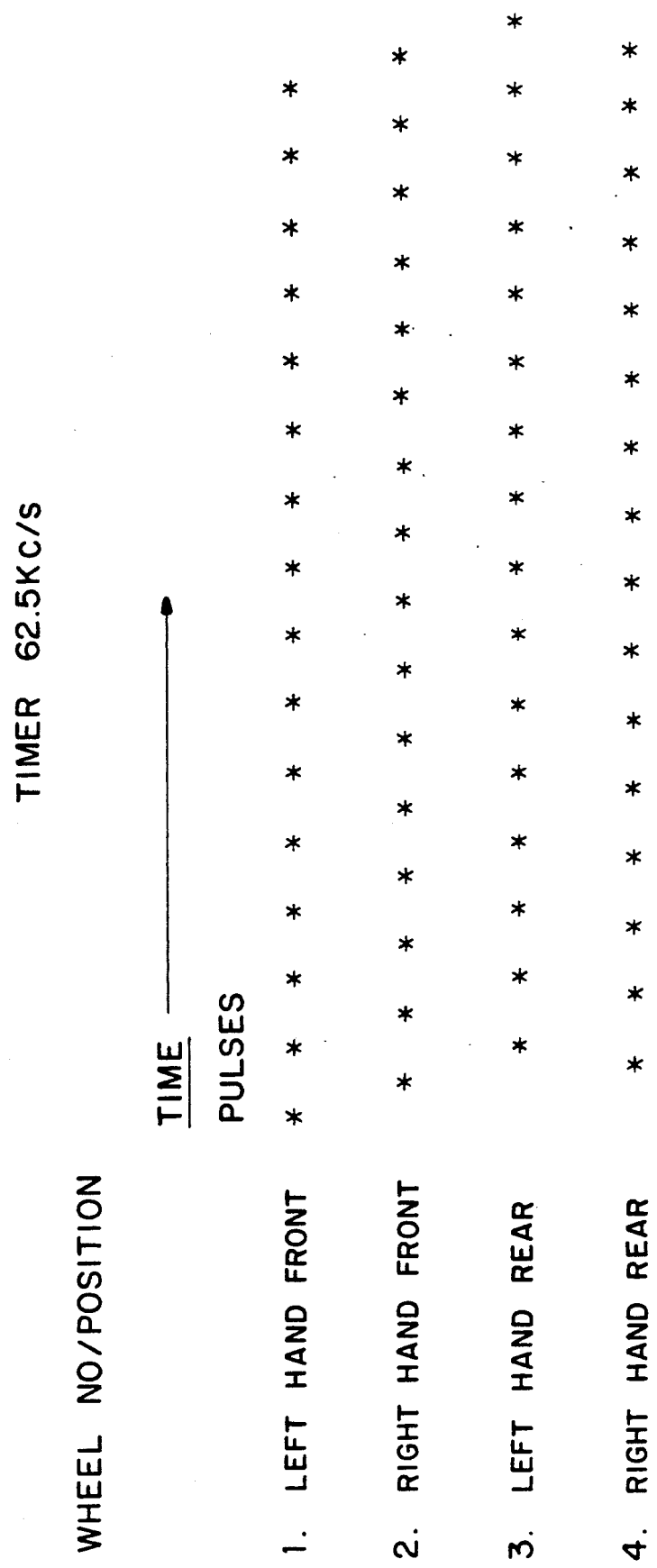

METHOD OF DETECTING A DEFLATED TIRE ON A VEHICLE

This invention relates to a method of detecting a deflated tire on a vehicle suitable for cars, trucks or the like and is an improvement to some aspects of the system disclosed in European Patent Publication No. 291217.

European Patent Publication No. 291217 is primarily aimed at vehicles having electronic anti-lock braking systems. Such electronic ABS systems have wheel speed signal generators which provide a multi-pulse signal usually of 48 or 96 pulses per revolution of each wheel, and the system described provides an add-on system for such a vehicle. It provides a deflation warning system having similar reliability to the ABS equipment and yet does not need additional wheel sensors or cabling because it can operate within the computer of the ABS equipment itself. Thus, while the system is effective and of low added cost to a vehicle already equipped with ABS, it is not economically viable on vehicles not so equipped.

SUMMARY OF THE INVENTION

An object of the present invention is to provide a deflation warning system utilizing simple wheel speed sensors.

According to one aspect of the present invention a method of detecting a partially deflated pneumatic tire on a vehicle having four tires each mounted on a wheel comprises sensing the angular velocity of each wheel by providing for each wheel, a signal generator to provide a single signal or pulse for each turn of the wheel, selecting a first wheel and measuring the time for one rotation of that first wheel, after beginning the first measurement, similarly measuring the times of rotation for each other wheel, storing the times for each of the wheels for at least three rotations of each wheel and averaging the times to produce an average angular velocity value for each wheel, processing the four average angular velocity valve signals in a processor unit which subtracts the sum of the average angular velocity valve signals from one pair of diagonally opposite wheels from the sum of the average angular velocity valve signals from the other pair of diagonally opposite wheels, sensing when the magnitude of the result is between 0.05% and, 0.60% of the mean of the two sums and, when it is, operating a warning device to indicate a tire is partially or completely deflated.

Preferably, the processing unit also looks at the angular velocity of each of the four wheels in turn and senses when one of the the signals is different from the average of all four signals by more than 0.1% and signals a deflation when both this signal and the previously mentioned signal factor are in the ranges specified.

The times may be measured against a standard clock frequency, which in one example is 62.5 kilocycles per second. A separate clock may be provided for each wheel and the clock or clocks may be started at the first pulse for the respective wheel or run continuously and the time recorded when the first or relevant pulse occurs.

In one arrangement at least three successive average angular velocity valves are stored for each wheel and interpolation is then used to calculate for each wheel the angular velocity at the chosen time so that the angular velocity of all wheels is known for the same time.

As an alternative to the single pulse for each revolution of each wheel, the single pulse signal may be derived from a multi-signal generator by ignoring intermediate signals between two successive signals from a preselected single signal generating segment. In this case, one preferred method is to begin the time of rotation for the first wheel from a first pulse and immediately begin the time of the rotation for each other wheel at the next pulse for the respective wheel following such first pulse.

In either case, rotations for each wheel are taken and this set of 15 rotations is divided into three groups of 5 rotations and the angular velocities of all four wheels are computed by interpolation to give the speeds at a predetermined time. The predetermined time is conveniently the time of the last of the four wheels beginning to be timed.

Preferably, the processing unit, following receipt of a calibration signal, measures the angular velocities of all four wheels, determines calculation constants to allow for the rolling radius of each tire at the time of calibration, and subsequently uses such constants to determine the existence of deflation. The calculation of the constants may be repeated at at least one higher speed of the vehicle to provide constants allowing for changes of rolling radius of the vehicle tires at such speeds and thus allow for differences in growth characteristics of different tires fitted to the vehicle.

BRIEF DESCRIPTION OF THE DRAWINGS

Further aspects of the present invention will become apparent from the following description of some embodiments in conjunction with the attached diagrammatic drawings in which:

FIG. 2 is a diagram showing the relative positions in time of each wheel and the pulses timed thereof.

DESCRIPTION OF THE PREFERRED EMBODIMENTS

Figure 1:
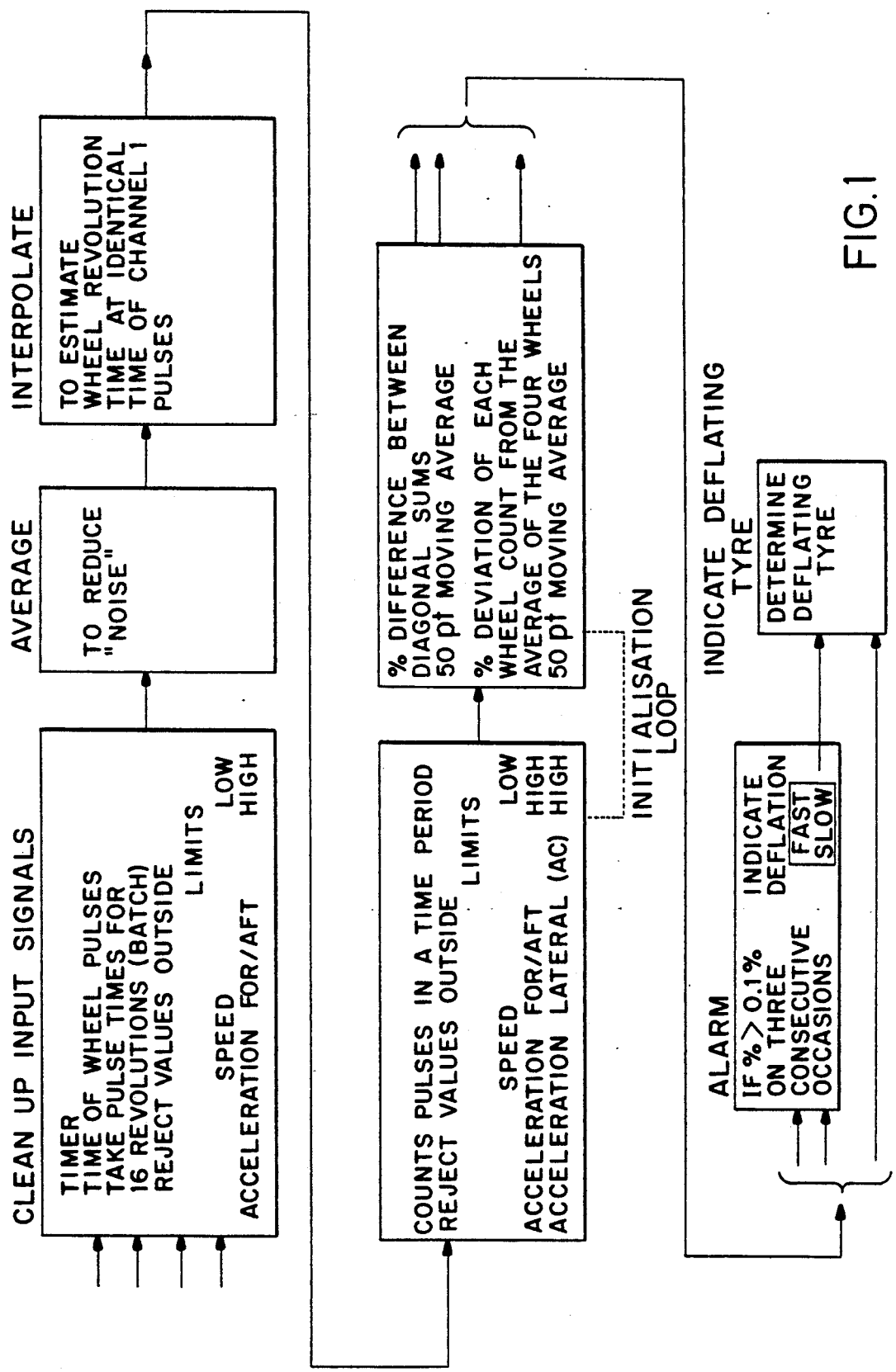
FIG. 1 is a block diagram showing the method of calculation comparing the full speeds.

The apparatus fitted to the vehicle is basically a pulse generator associated with each wheel comprising in the simplest embodiment a single magnet attached to each wheel for rotation therewith and attached to the vehicle suspension a stationary pickup such that a single pulse is obtained each time the wheel rotates. An alternative pick-up is the multi-tooth digital signal producing system used at each wheel used for an electronic anti-skid system commonly known as electronic ABS. In this latter case, the pick-up may be additionally connected to the ABS system and the same digital signal used as is used by the ABS system.

The signals from each wheel are carried through cables to the inputs of a central processing unit which is basically a computer and may in fact be the same computer as the ABS equipment where it is fitted. Four separate indicator lights are provided one for each wheel and these are most conveniently mounted on the vehicle dashboard.

The central processing unit monitors the various signals and compares them to determine whether or not it should give an outward signal to indicate that any tire on the vehicle is deflated.

The method of calculation will now be explained with reference to FIG. 2. Firstly, it should be understood that when the vehicle begins to move the four signal pulses, one for each wheel, will occur in a random manner according to where the wheels were left when the vehicle stopped. Thus, the first pulse to be received could come from any of the four wheels. For the sake of this explanation however, it will be assumed that wheel 1 is the first one to give an output pulse and indeed that the wheels 2, 3 and 4 will follow in the order 2,4,3 with their first pulse.

In the computer, a timer running at a fixed frequency of 62.5 kilocycles per second is running and when the first pulse comes from wheel 1 the time is noted. The times of the next 15 following pulses are also noted for that wheel giving 16 times in all. Immediately after the first pulse from wheel 1 the time of the next pulse from wheel 2 is noted followed by 15 further times for wheel 2. The same occurs for wheels 3 and 4 so that for each wheel 16 times have been recorded against the same clock. Immediately the last wheel to first signal its movement has completed its sixteenth time, the calculation of the signals begins. Firstly, for each wheel, 15 successive times of rotation are calculated and then grouped into three groups of five, each of which is averaged, so that three times result, each of which is averaged over five turns which reduces noise in the system.

Interpolation is then used to estimate the angular velocity of wheels 1, 2 and 3 at the instant when wheel 4 gave its first signal. The angular velocity of wheel 4 at that time is also calculated. Thus the angular velocities of all four wheels at the same instant are found.

The processing unit also calculates lateral and longitudinal acceleration of the vehicle by comparing the angular velocity signals for the wheels on each side of the vehicle and then comparing the signals from the front and rear pairs of wheels with the forward speed calculated from the means of the angular velocities of all four wheels. The lateral and longitudinal acceleration, figures are compared with a predetermined value for the vehicle concerned. In the case of longitudinal acceleration an acceleration greater than 0.3 g causes inhibition of deflation warning calculation. In the case of lateral acceleration, this occurs for figures greater than 0.06 g averaged over 5 turns of the wheels. This is to avoid false deflation warning signals due to weight transfer causing rolling radii of the tires to vary.

The system then calculates an error signal dT by comparing the angular velocities of the wheels according to the formula.

$$dT = \frac{2 \times (T14 - T23) \times 100}{T14 + T23}$$

where: T14=T1+T4
and T23=T2+T3
& T1, T2, T3 and T4 are the interpolated times, at the same instant, for 5 revolutions of the wheels 1, 2 3, 4, respectively. (1 is the left front, 2 the right front wheel, 3 the left rear wheel and 4 the right rear wheel).

It is, of course, to be understood that such times are directly proportional to the angular velocities of the wheels.

This dT signal is monitored and the processing unit prepares to sense a deflation if the signal is greater then 0.05% and less than 0.6%. In fact the existence of a puncture is then known and the next step is to find which tire is punctured.

The monitor unit looks at the difference between each wheel angular velocity in turn and the average speed of the four wheels and if the difference between any one wheel and the average is more than 0.1% a second signal is generated. If both dT and the difference signals exist in the ranges mentioned, then a deflation is sensed and the wheel concerned is determined and an output deflation signal is given by the monitoring system. This signal is used to light an indicator on the dash board of the vehicle and this indicator comprises 4 lights to show which wheel is deflated according to the difference signal between each wheel and the average.

As a safety guard against spurious signals, the warning signal is preferably delayed until three consecutive warning results have been obtained in the processing unit.

Each successive detection calculation of the processing unit occurs after 15 turns of the first wheel being considered. Following the sixteenth time for the last of the wheels being watched, there is a short time for computation and comparison of results and immediately following that, a further detection sequence is initiated. Thus, the sensitivity of the system with the filtering for 3 consecutive warning signals is slightly more than 45 turns of the wheels on a vehicle which means that the system has an operating time at most vehicle speeds of only a few seconds. Most importantly, the system works at very low vehicle speeds and, indeed, a puncture occuring overnight when the vehicle is stationary, is sensed as soon at the vehicle has covered 50 turns of its wheels, at a maximum.

To fully allow for tire and vehicle characteristics, it is necessary to trigger manually or otherwise a calibration initiating signal. This is done after changing one or more of the tires on the vehicle and may in some circumstances be necessary after reinflation, although this is not usual.

In some cases, where tires have substantial growth at high speed, it may be necessary to calibrate the system at two or more different speeds to allow for tire growth. This is not necessary when the tires on the vehicle are all the same construction. But, in the event of tires having different constructions being fitted to the vehicle, different growths at high speed may cause rolling radii to move out of acceptable tolerances and cause false signals. The system can be programmed to calibrate at different speeds to allow for this. In that case, initiation after changing a tire will satisfactorily correct and insert the necessary constants for the system to operate at all speeds.

The wheel speed signals may conveniently be achieved by using a single pulse generating system comprising a magnet rotating with the wheel and a pick up adjacent to it but mounted on the brake or suspension. This gives a single pulse per revolution. It is only one example of single pulse generators of this type and many others are known, any of which can be utilized for the invention. Similarly, the more normal multi-pulse signal generator used for anti-skid braking systems and braking control systems of the electronic type can be used. In that case, the intermediate pulses are omitted in the processing unit so that only one signal per revolution is used.

In the latter case of multi-pulse signal generators, an improved response time can be achieved by using a system to select the pulse counted according to the other wheels. Thus, where a first pulse on wheel 1 is timed for the first of the 15 time periods, the first following pulse on each of the other wheels can be taken for the first times for each of the other three wheels. Thus, the first times for each of the four wheels are very close to one another and the highest operating speed of the deflation warning system is achieved.

The embodiment described above uses a continuously running clock of 62.5 kilocycles and notes the times at each signal for each wheel. Obviously, there are many variations in this including using a separate clock for each wheel, switching the clock on at the first pulse and switching it off and noting the time period to simplify calculation and, indeed, varying the speed of the clock according to the speed of the vehicle to allow easier computation and avoid the high numbers necessary to be stored at higher vehicle speeds.

While the above description relates to sensing a puncture in the shortest possible time, it is also possible using the principles of this invention to monitor over a long time. This gives a possibility of detecting a smaller pressure loss. For example, a long monitor period over 50 successive calculations allows determination of pressure loss in one tire of 0.2 bar whereas the above described short term monitoring system gives pressure sensitivities of the order of 0.5 bar.

What we claim is:

1. A method of detecting a partially deflated pneumatic tire on a vehicle having first, second, third and fourth tires, each of the tires being mounted on a first, second, third and fourth wheel, respectively, comprising sensing the angular velocity of each of the wheels by providing for each of the wheels, a pulse generator means for providing a single pulse for each turn of each of the wheels, selecting the first wheel and measuring the time for one rotation of the first wheel, after beginning the measuring for the first wheel similarly measuring the times of one rotation for each of the second, third and fourth wheels, storing the times, for rotation of each of the wheels for at least three rotations of each of the wheels and averaging the times to produce an average angular velocity value signal for each of the wheels, storing in a processor unit at least 3 successive average angular velocity value signals for each of the wheels and calculating by interpolating therein the angular velocity for each of the wheels at a predetermined time, so that the angular velocities of all of the wheels are known for the same time, processing the four signals in the processor unit which subtracts the sum of the signals from one pair of diagonally opposite wheels from the sum of the signals from the other pair of diagonally opposite wheels, and senses when the magnitude of the resulting value is in a range between 0.05% and 0.60% of the mean of the two sums, and, when the resulting value is in the range, operating a warning device to indicate at least one of the tires is partially or completely deflated.

2. The method according to claim 1 wherein the times are each measured using at least one clock having a standard clock frequency.

3. The method according to claim 2, wherein there is a separate clock for each of the wheels.

4. The method according to claim 2 wherein the clock is started at the first pulse for each of the wheels being measured.

5. The method according to claim 2 wherein the clock runs continuously and the time is taken each time the pulse occurs.

6. The method according to claim 1 wherein the pulse generator means is a multi-pulse generator and the single pulse is derived from the multi-pulse generator by ignoring intermediate pulses between two successive pulses from a pre-selected single pulse generating segment.

7. The method according to claim 6 wherein the time of rotation for the first wheel is begun from a first pulse and the times of rotation for each remaining of the wheels are begun from the pulse for the respective wheel following the first pulse.

8. The method according to claim 1 wherein a set of 15 rotations of each of the wheels are taken, each of the set of 15 rotations is divided into three groups of 5 rotations each and the angular velocities of all four of the wheels are computed by interpolation to give the speeds at a predetermined time.

9. The method according to claim 8 wherein the interpolation is for the speeds at the start of timing of the fourth wheel to be timed.

10. The method according to claim 1 wherein the processing unit repeats the two sensing operations and operates the warning device when at least two successive results each give an indication of at least one of said tires being subject to pressure loss.

11. The method according to claim 1 wherein the processing unit also monitors lateral acceleration of the vehicle and inhibits the operation of the warning device for vehicle lateral accelerations greater than a predetermined value averaged over at least 5 turns of each of the wheels.

12. The method according to claim 11 wherein the predetermined value is 0.06 g.

13. The method according to claim 1 wherein the processing unit calculates the lateral acceleration by comparison of the wheel angular velocity signals from side to side of the vehicle and the vehicle forward speed calculated from the mean of the angular velocities.

14. The method according to claim 1 wherein the processing unit calculates the longitudinal acceleration and deceleration of the vehicle in its direction of travel by monitoring the rate of change of the sum of the angular velocity of all four of the wheels with relation to time and inhibits the operation of the warning device if the longitudinal acceleration or deceleration exceeds a predetermined value.

15. The method accoding to claim 14 wherein the predetermined value is 0.03 g.

16. The method according to claim 1 wherein the times are each measured using at least one clock having a clock frequency changeable at different vehicle speeds.

17. The method according to claim 1 wherein the processing unit is calibrated for measuring the angular velocities of all four of the wheels, by determining at least primary calculation constants to allow for the rolling radius of each of the tires at the time of calibration, and subsequently uses said primary calculation constants.

18. The method according to claim 17 wherein the determination of calculation constants is repeated at at least one higher speed than the speed at which the primary calculation constants were determined to provide secondary calculation constants allowing for changes in rolling radius of the vehicle tires at said at least one higher speed.

19. A method of detecting a partially deflated pneumatic tire on a vehicle having first, second, third and fourth tires, each of the tires being mounted on a first, second, third and fourth wheel, respectively, comprising sensing the angular velocity of each of the wheels by providing for each of the wheels, a pulse generator means for providing a single pulse for each turn of each of the wheels, selecting the first wheel and measuring the time for one rotation of the first wheel, after beginning the measuring for the first wheel similarly measuring the times of one rotation for each of the second, third and fourth wheels, storing the times for rotation of each of the wheels for at least three rotations of each of the wheels and averaging the times to produce an average angular velocity value signal for each of the wheels, storing in a processor unit at least 3 successive average angular velocity value signals for each of the wheels and calculating by interpolating therein the angular velocity for each of the wheels at a predetermined time, so that the angular velocities of all of the wheels are known for the same time, processing the four signals in the processor unit which subtracts the sum of the signals from one pair of diagonally opposite wheels from the sum of the signals from the other pair of diagonally opposite wheels, and senses when the magnitude of the resulting value is in a range between 0.05% and 0.60% of the mean of the two sums, and comparing in the processor unit the signal for each of the wheels in turn with the signals for each of the remaining wheels, to sense when one of the signals is different from the average of all four signals by more than 0.1%, and, when the resulting value is in the range and one of the sigals is different from the average of all four signals by more than 0.1%, operating a warning device to indicate at least one of the tires is partially or completely deflated.

* * * * *